United States Patent
Kato

(10) Patent No.: US 6,757,004 B2
(45) Date of Patent: Jun. 29, 2004

(54) SCANNING OPTICAL DEVICE AND IMAGE FORMING APPARATUS USING THE SAME

(75) Inventor: Manabu Kato, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/053,595

(22) Filed: Jan. 24, 2002

(65) Prior Publication Data

US 2002/0149668 A1 Oct. 17, 2002

(30) Foreign Application Priority Data

Jan. 29, 2001 (JP) ........................................ 2001-020051

(51) Int. Cl.⁷ ............................................. B41J 15/14
(52) U.S. Cl. ...................... 347/244; 347/241; 347/256
(58) Field of Search ................................ 347/244, 241, 347/256, 258; 359/205, 206, 208

(56) References Cited

U.S. PATENT DOCUMENTS

| 5,557,446 A | 9/1996 | Kato | 359/206 |
|---|---|---|---|
| 5,966,161 A | 10/1999 | Kato | 347/258 |
| 5,995,131 A | 11/1999 | Fujibayashi et al. | 347/258 |
| 6,038,053 A | 3/2000 | Kato | 359/205 |
| 6,094,286 A | 7/2000 | Kato | 359/206 |
| 6,133,935 A * | 10/2000 | Fujibayashi et al. | 347/258 |
| 6,424,446 B2 | 7/2002 | Toyoda et al. | 359/205 |

FOREIGN PATENT DOCUMENTS

| EP | 0 730 182 | 9/1996 |
| JP | 8-297256 | 11/1996 |
| JP | 10-232347 | 9/1998 |

* cited by examiner

*Primary Examiner*—Lamson Nguyen
(74) *Attorney, Agent, or Firm*—Fitzpatrick, Cella, Harper & Scinto

(57) ABSTRACT

There are provided a scanning optical device which makes the F-number in the sub scanning direction with respect to a light beam incident on a scanning target surface uniform by an easy, inexpensive method without impairing the environmental performance, and is suitable for high-resolution printing, and an image forming apparatus using the device. This device includes the first optical system which converts the state of a light beam emitted from a light source means, the second optical system which forms the converted light beam into a linear image elongated in the main scanning direction, a deflection element which reflects/deflects an incident light beam in the main scanning direction, and the third optical system which forms the light beam reflected/deflected by the deflection element into an image on the scanning target surface. The third optical system includes an optical element having at least one diffraction surface and at least one optical element having a refraction surface. The radius of curvature of at least one refraction surface in the sub scanning direction changes from an on-axis portion toward an off-axis portion, and the diffraction power of at least one diffraction surface in the sub scanning direction changes from an on-axis portion toward an off-axis portion.

42 Claims, 8 Drawing Sheets

SCANNING OPTICAL DEVICE AND IMAGE FORMING APPARATUS USING THE SAME

BACKGROUND OF THE INVENTION

1. Field of the Invention

The present invention relates to a scanning optical device and an image forming apparatus using the device and, more particularly, to a scanning optical device which records image information by deflecting a light beam emitted from a light source means using a deflection element, and optically scanning a scanning target surface via an imaging element having an f-θ characteristic and is suitable for an image forming apparatus using an electrophotographic process, such as a laser beam printer, digital copying machine, or multi-functional printer.

2. Related Background Art

Conventionally, in a scanning optical device used for a laser printer (LBP), digital copying machine, or the like, a light beam which is optically modulated in accordance with an image signal and emitted from a light source means is periodically deflected by a light deflector such as a rotating polyhedral mirror (polygon mirror), and the light is focused into a spot on the surface of a photosensitive recording medium (photosensitive drum) by a scanning optical element having an f-θ characteristic, thereby optically scanning the surface and recording an image.

FIG. 14 is a schematic view of the main part of a conventional scanning optical device of this type.

Referring to FIG. 14, a divergent light beam emitted from a light source means 91 is converted into a substantially parallel light beam by a collimator lens 92. The light beam (light amount) is limited by a stop 93 and incident on a cylindrical lens 94 having a predetermined refracting power only in the sub scanning direction. Of the substantially parallel light beam incident on the cylindrical lens 94, the light in a main scanning cross-section emerges without any change. The light in a sub scanning cross-section is focused and substantially formed into a linear image on a deflection surface (reflection surface) 95a of a light deflector 95 formed by a rotating polyhedral mirror (polygon mirror).

The light beam reflected/deflected by the deflection surface 95a of the light deflector 95 is guided onto a photosensitive drum surface 98 as a scanning target surface via an imaging means (f-θ lens) 96 having an f-θ characteristic. By rotating the light deflector 95 in the direction indicated by an arrow A, the photosensitive drum surface 98 is optically scanned in the direction indicated by an arrow B. With this operation, an image is recorded on the photosensitive drum surface 98 as a recording medium.

A scanning optical device of this type needs to form a uniform spot by correcting the curvature of field throughout the scanning target surface and have a distortion (f-θ characteristic) that makes the angle of incident light and image height have a proportional relationship.

Recently, however, in addition to these requirements, the following are considered important to realize high-resolution printing:

(1) to set a uniform spot size in the sub scanning direction within an image effective area; and (2) to set a uniform adjacent pitch interval within the image effective area in multi-beam scanning. It is therefore required that the F-number (Fno) in the sub scanning direction with respect to a light beam incident on the scanning target surface be uniform within the image effective area.

As a scanning optical element, a plastic lens has become mainstream, which has the merit of realizing high-precision aberration correction using an aspherical surface, allowing mass production by molding at low cost, and the like.

A plastic lens, however, has the property of changing in refractive index with a use environment change (temperature change). For this reason, focus variation occurs on the scanning target surface, posing a problem in high-resolution printing. It is therefore required to perform temperature compensation in the sub scanning direction in which the imaging magnification is high and focus variation is noticeable.

According to Japanese Patent Application Laid-Open Nos. 8-297256 and 10-232347 and the like previously proposed by the present assignee, the radii of curvature of at least two surfaces of a scanning optical element in the sub scanning direction are changed from an on-axis portion toward an off-axis portion with respect to the main scanning direction to make the F-number in the sub scanning direction with respect to a light beam incident on the scanning target surface uniform within the image effective area.

According to these references, the F-number is made uniform by bending the surface shape within a sub scanning cross-section. For this reason, the radius of curvature of a surface in the sub scanning direction may abruptly change depending on the surface shape within a main scanning cross-section of the scanning optical element.

SUMMARY OF THE INVENTION

It is an object of the present invention to provide a scanning optical device which can make the F-number (Fno) in the sub scanning direction with respect to a light beam incident on a scanning target surface uniform with an easy, simple arrangement by further improving the above proposals without impairing the environmental performance, and is suitable for high-resolution printing, and an image forming apparatus using the device.

In one aspect of the invention, scanning optical device includes:

a deflection element which reflects/deflects a light beam emitted from light source means in a main scanning direction; and a scanning optical system which forms the light beam reflected/deflected by said deflection means into an image on a scanning target surface, wherein said scanning optical system includes an optical element having at least one diffraction surface and at least one optical element having a refraction surface, and a radius of curvature of at least one refraction surface in a sub scanning direction changes from an on-axis portion toward an off-axis portion, and a diffraction power of at least one diffraction surface in the sub scanning direction changes from an on-axis portion toward an off-axis portion.

In further aspect of the foregoing scanning optical device, the radius of curvature of said at least one refraction surface in the sub scanning direction continuously changes from an on-axis portion toward an off-axis portion with respect to the main scanning direction.

In further aspect of the foregoing scanning optical device, the diffraction power of said at least one diffraction surface in the sub scanning direction continuously changes from an on-axis portion toward an off-axis portion with respect to the main scanning direction.

In further aspect of the foregoing scanning optical device, an F-number in the sub scanning direction with respect to a light beam incident on the scanning target surface is made substantially constant within an image effective area by changing the radius of curvature of said at least one refraction surface in the sub scanning direction and the diffraction power of said at least one diffraction surface in the sub scanning direction.

In further aspect of the foregoing scanning optical device, an image magnification of said scanning optical system in the sub scanning direction is substantially constant within an image effective area.

In further aspect of the foregoing scanning optical device, letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9$$

In further aspect of the foregoing scanning optical device, a change in focus of said scanning optical device on the scanning target surface in the sub scanning direction due to an environmental variation is compensated for by changes in power of the refraction surface and diffraction surface of said scanning optical system and a change in wavelength of said light source means.

In further aspect of the foregoing scanning optical device, letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r / \phi S_d < 2.6$$

In further aspect of the foregoing scanning optical device, at least one of a change in the radius of curvature of the refraction surface of said scanning optical system in the sub scanning direction and a change in the diffraction power of the diffraction surface in the sub scanning direction is asymmetrical with respect to the optical axis of said scanning optical system.

In further aspect of the foregoing scanning optical device, at least one optical element of said scanning optical system is manufactured by plastic molding.

In another aspect of the invention, a scanning optical device includes:

light source means for emitting a plurality of light beams which are optically modulated independently;

a deflection element which reflects/deflects a plurality of light beams in a main scanning direction; and a scanning optical system which forms the plurality of light beams reflected/deflected by said deflection means into an image on a scanning target surface, wherein said scanning optical system includes an optical element having at least one diffraction surface and at least one optical element having a refraction surface, and a radius of curvature of at least one refraction surface in a sub scanning direction continuously changes from an on-axis portion toward an off-axis portion, and a diffraction power of at least one diffraction surface in the sub scanning direction continuously changes from an on-axis portion toward an off-axis portion.

In further aspect of the foregoing scanning optical device, the radius of curvature of said at least one refraction surface in the sub scanning direction continuously changes from an on-axis portion toward an off-axis portion with respect to the main scanning direction.

In further aspect of the foregoing scanning optical device, the diffraction power of said at least one diffraction surface in the sub scanning direction continuously changes from an on-axis portion toward an off-axis portion with respect to the main scanning direction.

In further aspect of the foregoing scanning optical device, an F-number in the sub scanning direction with respect to a light beam incident on the scanning target surface is made substantially constant within an image effective area by changing the radius of curvature of said at least one refraction surface in the sub scanning direction and the diffraction power of said at least one diffraction surface in the sub scanning direction.

In further aspect of the foregoing scanning optical device, an image magnification of said scanning optical system in the sub scanning direction is substantially constant within an image effective area.

In further aspect of the foregoing scanning optical device, letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9$$

In further aspect of the foregoing scanning optical device, a change in focus of said scanning optical device on the scanning target surface in the sub scanning direction due to an environmental variation is compensated for by changes in power of the refraction surface and diffraction surface of said scanning optical system and a change in wavelength of said light source means.

In further aspect of the foregoing scanning optical device, letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r / \phi S_d < 2.6$$

In further aspect of the foregoing scanning optical device, at least one of a change in the radius of curvature of the refraction surface of said scanning optical system in the sub scanning direction and a change in the diffraction power of the diffraction surface in the sub scanning direction is asymmetrical with respect to the optical axis of said scanning optical system.

In further aspect of the foregoing scanning optical device, at least one optical element of said scanning optical system is manufactured by plastic molding.

In still another aspect of the invention, a scanning optical device includes:

a deflection element which reflects/deflects a light beam emitted from light source means in a main scanning direction; and a scanning optical system which forms the light beam reflected/deflected by said deflection means into an image on a scanning target surface, wherein said scanning optical system includes a single optical element having refraction and diffraction surfaces, and a radius of curvature of the refraction surface in the sub scanning direction changes from an on-axis portion toward an off-axis portion, and a diffraction power of the diffraction surface in the sub scanning direction changes from an on-axis portion toward an off-axis portion.

In further aspect of the foregoing scanning optical device, the radius of curvature of the refraction surface in the sub scanning direction continuously changes from an on-axis portion toward an off-axis portion with respect to the main scanning direction.

In further aspect of the foregoing scanning optical device, the diffraction power of the diffraction surface in the sub scanning direction continuously changes from an on-axis portion toward an off-axis portion with respect to the main scanning direction.

In further aspect of the foregoing scanning optical device, an F-number in the sub scanning direction with respect to a light beam incident on the scanning target surface is made substantially constant within an image effective area by changing the radius of curvature of the refraction surface in the sub scanning direction and the diffraction power of the diffraction surface in the sub scanning direction.

In further aspect of the foregoing scanning optical device, an image magnification of said scanning optical system in the sub scanning direction is substantially constant within an image effective area.

In further aspect of the foregoing scanning optical device, letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9$$

In further aspect of the foregoing scanning optical device, a change in focus of said scanning optical device on the scanning target surface in the sub scanning direction due to an environmental variation is compensated for by changes in power of the refraction surface and diffraction surface of said scanning optical system and a change in wavelength of said light source means.

In further aspect of the foregoing scanning optical device, letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r / \phi S_d < 2.6$$

In further aspect of the foregoing scanning optical device, one of a change in the radius of curvature of the refraction surface of said scanning optical system in the sub scanning direction and a change in the diffraction power of the diffraction surface in the sub scanning direction is asymmetrical with respect to the optical axis of said scanning optical system.

In further aspect of the foregoing scanning optical device, one optical element of said scanning optical system is manufactured by plastic molding.

In still another aspect of the invention, a scanning optical device includes:

light source means for emitting a plurality of light beams which are optically modulated independently;

a deflection element which reflects/deflects a plurality of light beams in a main scanning direction; and a scanning optical system which forms the plurality of light beams reflected/deflected by said deflection means into an image on a scanning target surface, wherein said scanning optical system includes a single optical element having refraction and diffraction surfaces, and a radius of curvature of the refraction surface in the sub scanning direction changes from an on-axis portion toward an off-axis portion, and a diffraction power of the diffraction surface in the sub scanning direction changes from an on-axis portion toward an off-axis portion.

In further aspect of the foregoing scanning optical device, the radius of curvature of the refraction surface in the sub scanning direction continuously changes from an on-axis portion toward an off-axis portion with respect to the main scanning direction.

In further aspect of the foregoing scanning optical device, the diffraction power of the diffraction surface in the sub scanning direction continuously changes from an on-axis portion toward an off-axis portion with respect to the main scanning direction.

In further aspect of the foregoing scanning optical device, an F-number in the sub scanning direction with respect to a light beam incident on the scanning target surface is made substantially constant within an image effective area by changing the radius of curvature of the refraction surface in the sub scanning direction and the diffraction power of the diffraction surface in the sub scanning direction.

In further aspect of the foregoing scanning optical device, an image magnification of said scanning optical system in the sub scanning direction is substantially constant within an image effective area.

In further aspect of the foregoing scanning optical device, letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9$$

In further aspect of the foregoing scanning optical device, a change in focus of said scanning optical device on the scanning target surface in the sub scanning direction due to an environmental variation is compensated for by changes in power of the refraction surface and diffraction surface of said scanning optical system and a change in wavelength of said light source means.

In further aspect of the foregoing scanning optical device, letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r / \phi S_d < 2.6$$

In further aspect of the foregoing scanning optical device, one of a change in the radius of curvature of the refraction surface of said scanning optical system in the sub scanning direction and a change in the diffraction power of the diffraction surface in the sub scanning direction is asymmetrical with respect to the optical axis of said scanning optical system.

In further aspect of the foregoing scanning optical device, one optical element of said scanning optical system is manufactured by plastic molding.

In still another aspect of the invention, an image forming apparatus includes the foregoing scanning optical device, a photosensitive member placed on the scanning target surface, a developing unit which develops an electrostatic latent image formed on said photosensitive member by a light beam scanned by said scanning optical device into a toner image, a transfer unit which transfers the developed toner image onto a transfer material, and a fixing unit which fixes the transferred toner image on the transfer material.

In still another aspect of the invention, an image forming apparatus includes the foregoing scanning optical device, and a printer controller which converts code data input from an external unit into an image signal and inputs the signal to said scanning optical device.

DETAILED DESCRIPTION OF THE PREFERRED EMBODIMENTS

First Embodiment

Figure 1:
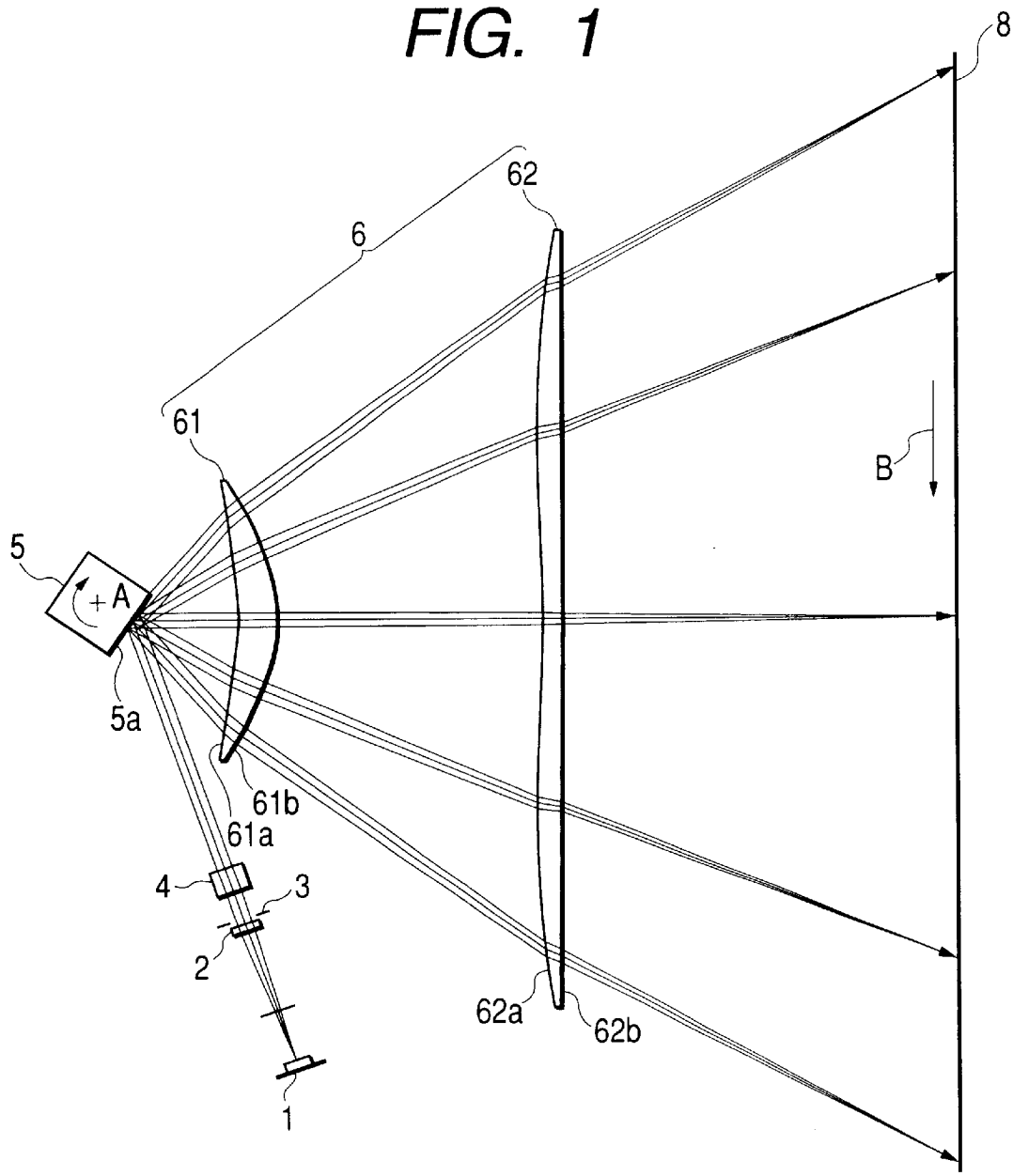
FIG. 1 is a main scanning cross-sectional view of the first embodiment of the present invention.
Figure 2:
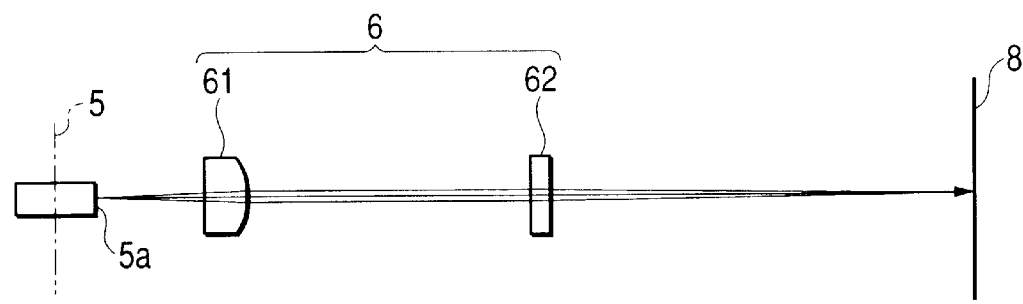
FIG. 2 is a sub scanning cross-sectional view of the first embodiment of the present invention.

FIG. 1 is a sectional view (main scanning cross-sectional view) of the main part of the first embodiment of the present invention in the main scanning direction. FIG. 2 is a sectional view (sub scanning cross-sectional view) of the main part in the sub scanning direction in FIG. 1.

Note that in this specification, a plane formed by the optical axis of a scanning optical element and the light beam deflected by a light deflector is defined as a main scanning cross-section, and a plane which includes the optical axis of the scanning optical element and is perpendicular to the main scanning cross-section is defined as a sub scanning cross-section.

Referring to FIG. 1, a light source means 1 is formed by, for example, a semiconductor laser. A collimator lens 2 serves as the first optical system and converts a divergent light beam emitted from the light source means 1 into a substantially parallel light beam. An aperture stop 3 limits a passing light beam (light amount). A cylindrical lens (cylinder lens) 4 serves as the second optical system. The cylindrical lens 4 has a predetermined refracting power only in the sub scanning direction and forms a light beam passing through the aperture stop 3 into an almost linear image on a deflection surface 5a of a light deflector 5 (to be described later) within a sub scanning cross-section.

Note that each of the collimator lens 2, aperture stop 3, and cylindrical lens 4 serves as an element of an incident optical means.

The light deflector 5 is a deflection means which has a deflection surface near the imaging position of the cylindrical lens and reflects/deflects an incident light beam in the main scanning direction. The light deflector 5 is, for example, formed by a polygon mirror (rotating polyhedral mirror) and is rotated by a driving means (not shown) such as a motor at a constant speed in the direction indicated by an arrow A in FIG. 1.

A scanning optical element (scanning lens system) 6 serves as the third optical system having an f-θ characteristic and includes a refraction optical element 61 made of a plastic material and a long diffraction optical element 62 having at least one diffraction surface.

The scanning optical element 6 forms a light beam based on image information and reflected/deflected by the light deflector 5 into an image on a photosensitive drum surface 8 and corrects any surface inclination of the deflection surface 5a of the light deflector 5 within a sub scanning cross-section.

The refraction optical element 61 serving as an element of the scanning optical element 6 is formed by a single toric lens having different powers in the main scanning direction (within a main scanning cross-section) and the sub scanning direction (within a sub scanning cross-section). The radius of curvature of at least one refraction surface of the toric lens 61 in the sub scanning direction continuously changes from an on-axis portion toward an off-axis portion with respect to the main scanning direction. In this embodiment, the radius of curvature of an exit surface 61b of the toric lens 61 in the sub scanning direction continuously changes from an on-axis portion toward an off-axis portion.

An incident surface 62a of the diffraction optical element 62 is formed by a composite element having a refraction surface as an incident surface 62a and a diffraction surface as an exit surface 62b. This diffraction optical element 62 has different powers in the main scanning direction and the sub scanning direction. The diffraction power of at least one diffraction surface of the diffraction optical element 62 in the sub scanning direction continuously changes from an on-axis portion toward an off-axis portion with respect to the main scanning direction. In this embodiment, the diffraction power of the exit surface 62b of the diffraction optical element 62 in the sub scanning direction continuously changes from an on-axis portion toward an off-axis portion.

In this embodiment, the F-number associated with a light beam incident on the photosensitive drum surface 8 in the sub scanning direction is made almost constant within an image effective area by changing the radius of curvature of the exit surface 61b of the toric lens 61 in the sub scanning direction and the diffraction power of the exit surface (diffraction surface) 62b of the diffraction optical element 62 in the sub scanning direction.

The photosensitive drum surface 8 serves as a scanning target surface.

In this embodiment, the divergent light beam emitted from the semiconductor laser 1 is converted into a substantially parallel light beam by the collimator lens 2. The light beam (light amount) is then limited by the aperture stop 3 and strikes the cylindrical lens 4. Of the substantially parallel light beam incident on the cylindrical lens 4, the light beam with a main scanning cross-section exits without any change. On the other hand, the light beam with a sub scanning cross-section converges and forms a substantially linear image (a linear image elongated in the main scanning direction) on the deflection surface 5a of the light deflector 5. The light beam deflected by the deflection surface 5a of the light deflector 5 is guided onto the photosensitive drum surface 8 via the toric lens 61 and diffraction optical element 62. By rotating the light deflector 5 in the direction indicated by the arrow A, this light beam is scanned on the photosensitive drum surface 8 in the direction indicated by the arrow B. With this operation, an image is recorded on the photosensitive drum surface 8 as a recording medium.

The surface shapes of the refraction surface and diffraction surface of the scanning optical element 6 in this embodiment are expressed by the following equations.

Refraction Surface

Provided that the intersection between each optical element surface and the optical axis is regarded as an origin, and the optical axis direction, the direction perpendicular to the optical axis within the main scanning cross-section, and the direction perpendicular to the optical axis within the sub scanning cross-section respectively correspond to the X-axis, the Y-axis, and the Z-axis, the surface configuration in the meridional direction corresponding to the main scanning direction is expressed by $$x = \frac{Y^2/R}{1+(1-(1+K)(Y/R^2)^{1/2}} + B_4 Y^4 + B_6 Y^6 + B_8 Y^8 + B_{10} Y^{10}$$

where R is the radius of curvature, and K, $B_4$, $B_6$, $B_8$, and $B_{10}$ are aspherical coefficients.

The surface configuration in the sagittal direction corresponding to the sub scanning direction (the direction which includes the optical axis and is perpendicular to the main scanning direction) is expressed by $$S = \frac{Z^2/r'}{1+(1-(Z/r')^2)^{1/2}}$$

for $r' = r_0(1+D_2 Y^2 + D_4 Y^4 + D_6 Y^6 + D_8 Y^8 + D_{10} Y^{10})$
where $r_0$ is the sagittal radius of curvature on the optical axis, and $D_2$, $D_4$, $D_6$, $D_8$, and $D_{10}$ are aspherical coefficients.

Diffraction Surface

The surface configuration in the main scanning direction is expressed by phase functions up to the sixth order, and the surface configuration in the sub scanning direction is expressed by different second-order phase functions depending on the position in the main scanning direction.

$$\phi = m\lambda = b_2 Y^2 + b_4 Y^4 + b_6 Y^6 + b_8 Y^8 + b_{10} Y^{10} + (d_0 + d_1 Y + d_2 Y^2 + d_3 Y^3 + d_4 Y^4)Z^2$$

where $\phi$ is a phase function, m is a diffraction order, $\lambda$ is the wavelength used, Y is the height from the optical axis of the lens, and $b_2$, $b_4$, $b_6$, $b_8$, $b_{10}$, $d_0$, $d_1$, $d_2$, $d_3$, and $d_4$ are phase coefficients (in the first to fourth embodiments, +1-order diffracted light is used).

Note that in these equations, expressions for aspherical surfaces and the orders in phase functions are limited. However, the present invention is not limited to this.

The function of the scanning optical element 6 in the sub scanning direction in this embodiment will be described below.

(a) Curvature of field in sub scanning direction and correction of surface inclination of surface inclination The linear image formed near the deflection surface of the light deflector is formed again near the scanning target surface to correct the curvature of field in the sub scanning direction and also correct the surface inclination of the deflection surface.

(b) Making imaging magnification in sub scanning direction constant within image effective area By making the imaging magnification in the sub scanning direction constant within an image effective area substantially constant, a uniform F-number (Fno) in the sub scanning direction can be set with respect to a light beam incident on the scanning target surface. This makes it possible to make spot diameters in the sub scanning direction uniform within the image effective area and make the intervals between adjacent scanning lines in a multi-beam scanning optical device (to be described later) constant.

(c) Temperature compensation in sub scanning direction

By setting the power ratio between the refraction surface and diffraction surface of the scanning optical element in the sub scanning direction as $$1.0 < \phi S_r / \phi S_d < 2.6 \quad (1)$$

where $\phi S_d$ is the on-axis power on the diffraction surface of the scanning optical element in the sub scanning direction, and $\phi S_r$ is the on-axis power on the refraction surface of the scanning optical element in the sub scanning direction (the total power, if a plurality of corresponding surfaces exist in either case), a change in focus on the scanning target surface in the sub scanning direction due to an environmental change (temperature change) around the scanning optical device is compensated for by changes in power on the refraction and diffraction surfaces and a change in the wavelength of a semiconductor laser.

Conditional expression (1) is associated with the ratio between the on-axis power on the refraction surface of the scanning optical element in the sub scanning direction and the on-axis power on the diffraction surface in the sub scanning direction. If the ratio exceeds the lower limit of conditional expression (1), temperature over-compensation occurs. If the ratio exceeds the upper limit of conditional expression (1), temperature under-compensation occurs.

A characteristic feature of this embodiment is that the above three functions (a), (b), and (c) are executed in the image effective area. For this purpose, it is required that the powers on at least one refraction surface and one diffraction surface of the main scanning element in the sub scanning direction continuously change from an on-axis portion toward an off-axis portion with respect to the main scanning direction. In this case, at least two degrees of freedom are set for three correction targets. This is because the shape in the main scanning direction can be added to the degrees of freedom. In addition, it is preferable that the power on either the refraction surface or the diffraction surface be continuously changed from an on-axis portion toward an off-axis portion.

Figure 3:
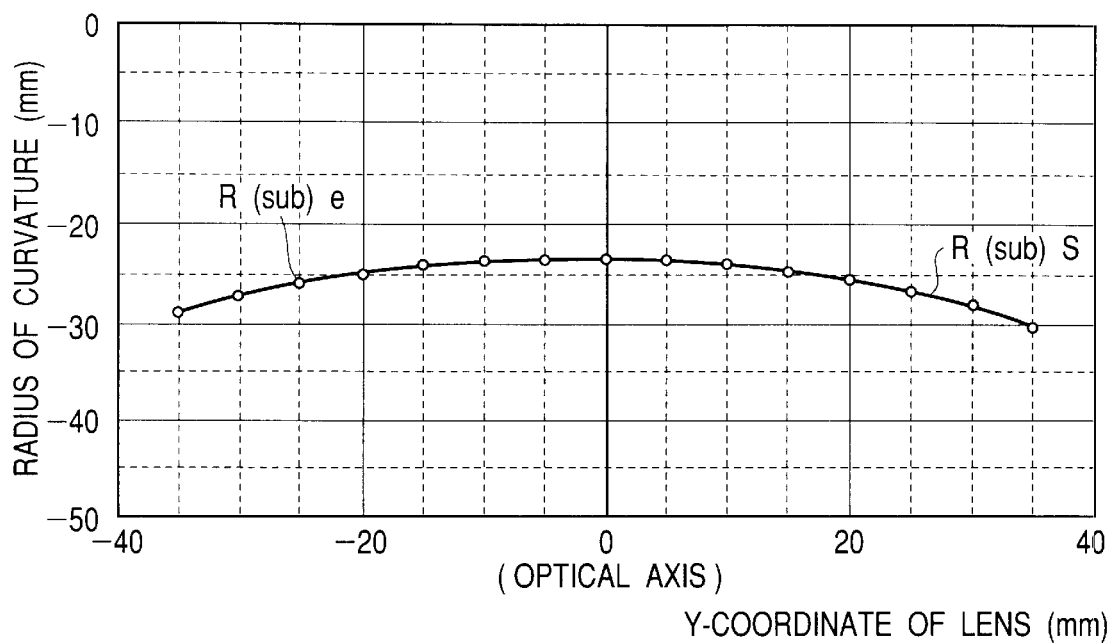
FIG. 3 is a graph showing a change in the radius of curvature of the exit surface of a toric lens in the sub scanning direction according to the first embodiment of the present invention.

Table 1 shows design data in this embodiment.

direction are asymmetrical with respect to the optical axis (see FIG. 3). The radii of curvature R(sub)s and R(sub)e in the sub scanning direction change from an on-axis portion toward an off-axis portion in accordance with a distance Y from the optical axis in the main scanning direction (y direction).

Figure 4:
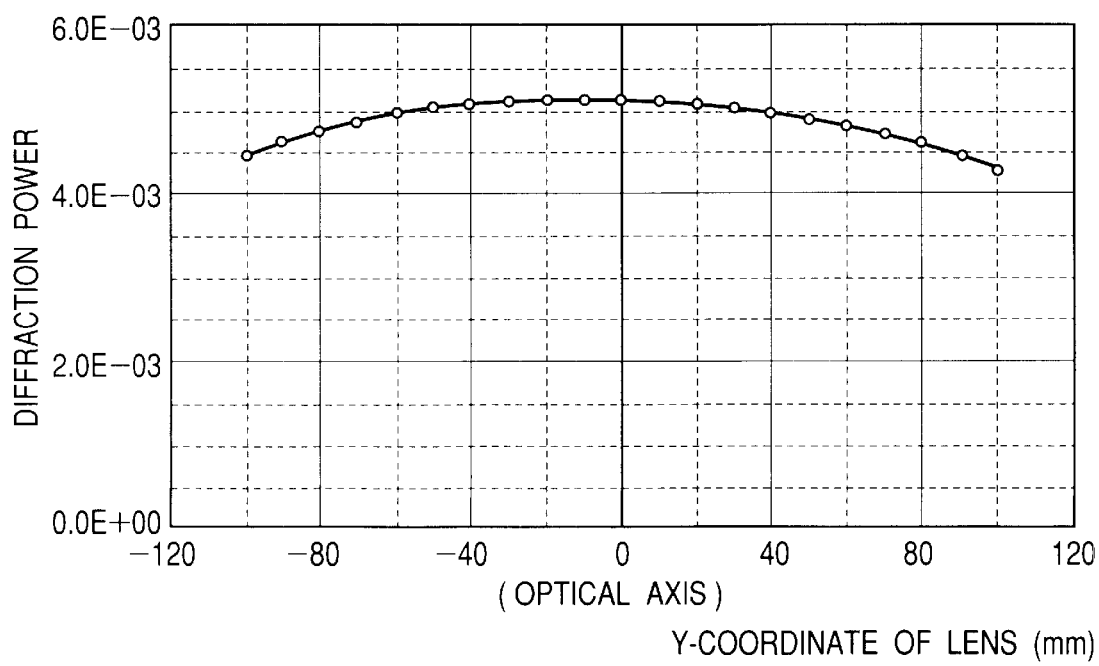
FIG. 4 is a graph showing a change in the diffraction power of the exit surface of a diffraction optical element in the sub scanning direction according to the first embodiment of the present invention.

FIG. 3 is a graph showing a change in the radius of curvature of the exit surface 61b of the toric lens 61 in the sub scanning direction. FIG. 4 is a graph showing a change in the diffraction power of the exit surface 62b of the diffraction optical element 62 in the sub scanning direction.

Referring to FIG. 3, the radius of curvature in the sub scanning direction continuously decreases from the optical

TABLE 1

Design Data

| Wavelength Refractive Index | | | Surface Shape of Toric Lens 61 | | | Surface Shape of Long Diffraction Element 62 | |
|---|---|---|---|---|---|---|---|
| | | | First Surface | Second Surface | | | |
| Wavelength Used | λ(nm) | 780 | face | face | | First Surface | Second Surface |
| Refractive Index of Toric Lens 61 | ndt | 1.53064 | R −8.84696E+01 | −4.63992E+01 | R | −3.92336E + 02 | ∞ |
| Abbe Number | υdt | 55.5 | K −5.39190E−01 | −8.46048E−01 | K | −6.01601E+01 | |
| Refractive Index of Long Diffraction Element 62 | ndd | 1.53064 | B4 1.16004E−06 | 3.12272E−07 | B4 | 2.11808E−07 | |
| Abbe Number | υdd | 55.5 | B6 1.34535E−09 | 5.20228E−10 | B6 | −2.03707E−11 | |
| Angle of Incident Light | | | B8 −1.08687E−12 | 5.33696E−13 | B8 | 1.13519E−15 | |
| Polygon Incident Angle | θp | −70.0 | B10 1.83812E−16 | −3.91099E−16 | B10 | −2.89613E−20 | |
| Polygon Maximum Exit Angle | θe | 45.0 | r 1.25792E+02 | −2.35121E+01 | Phase Function of Long Diffraction Element 62 | | |
| Arrangement | | | D2$_s$ | 1.42610E−04 | | First Surface | Second Surface |
| | | | D4$_s$ | 4.51766E−08 | b2 | | −2.00598E−04 |
| Polygon Surface | e1 | 30.0 | D6$_s$ | −4.91307E−12 | b4 | | 1.44782E−08 |
| Center Thickness of Toric Lens | d1 | 11.0 | D2$_e$ | 2.16498E−04 | b6 | | −2.67807E−12 |
| Toric Lens - Long Diffraction Element | e2 | 75.0 | D4$_e$ | −2.59581E−08 | b8 | | 2.30099E−16 |
| Center Thickness of Long Diffraction Element | d2 | 5.0 | D6$_e$ | 3.63508E−11 | b10 | | −7.63301E−21 |
| Long Diffraction Element - Scanning Target Surface | Sk | 111.0 | | | d0 | | −5.11153E−03 |
| Polygon Axis - Scanning Target Surface | L | 232.0 | suffix s indicates laser side | | d1 | | 1.30525E−05 |
| Effective Scanning Width | W | 297.0 | suffix e indicates side opposite to laser | | d2 | | 6.91743E−08 |
| | | | Y-axis sign + indicates side opposite to laser | | d3 | | −5.66373E−11 |
| | | | | | d4 | | 5.16727E−13 |

In this embodiment, as described above, the radius of curvature of the exit surface 61b of the toric lens 61 in the sub scanning direction is continuously changed from an on-axis portion toward an off-axis portion, and the diffraction power of the exit surface 62b of the diffraction optical element 62 is continuously changed from an on-axis portion toward an off-axis portion.

Figure 13:
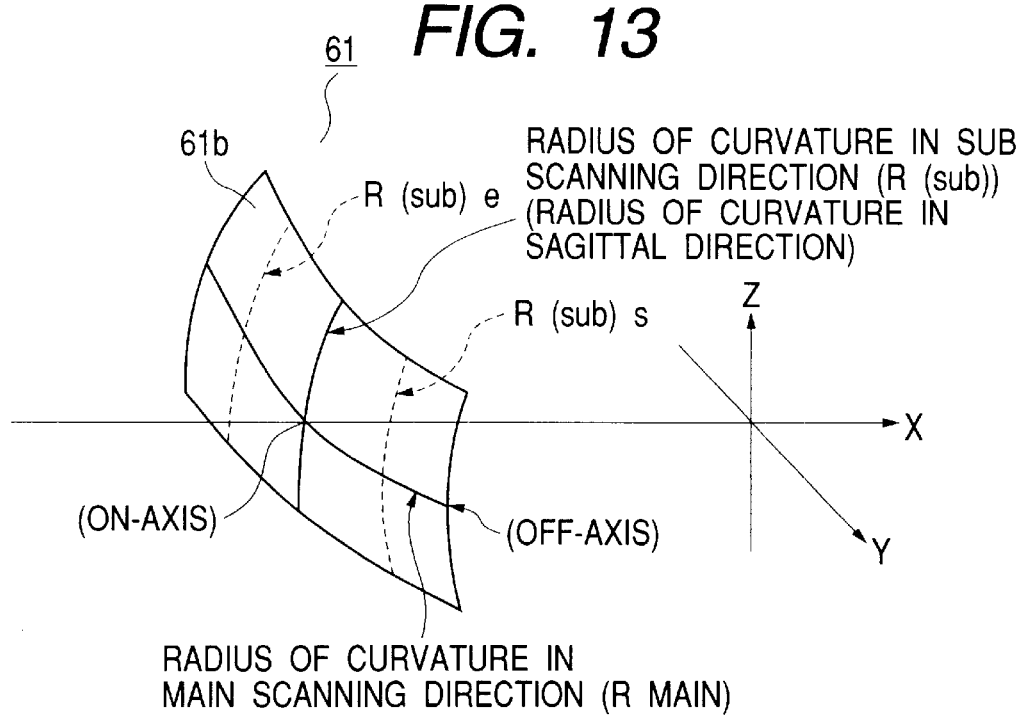
FIG. 13 is a schematic view showing only the exit surface of the toric lens according to the first embodiment of the present invention.

FIG. 13 is a schematic view showing only the exit surface 61b of the toric lens 61. Referring to FIG. 13, the radius of curvature Rmain is based on part of an aspherical surface. A radius of curvature R(sub) in the sub scanning direction changes from an on-axis portion toward an off-axis portion. A radii of curvature R(sub)s and R(sub)e in the sub scanning axis (Y=0) toward an off-axis portion. Referring to FIG. 4, the diffraction power decreases from the optical axis (Y=0) to an off-axis portion. The radius of curvature of the toric surface and the diffraction power of the diffraction surface are laterally asymmetrical with respect to the optical axis (Y=0).

In this embodiment, as described above, a change in the radius of curvature R(sub) of the exit surface 61b of the toric lens 61 in the sub scanning direction is made asymmetrical with a change in the diffraction power of the exit surface 62b of the diffraction optical element 62 in the sub scanning direction with respect to the optical axis of the scanning optical element 6.

In this embodiment, letting $F_{max}$ and $F_{min}$ be the maximum and minimum values of the F-number in the sub scanning direction with respect to a light beam incident on the scanning target surface within the image effective area, the following condition is satisfied:

$$F_{min}/F_{max} > 0.9 \quad (2)$$

Conditional expression (2) is associated with the ratio between the maximum and minimum values of the F-number in the sub scanning direction with respect to a light beam incident on the scanning target surface. If the ratio deviates from conditional expression (2), it is difficult to make the spot diameter in the sub scanning direction uniform.

In this embodiment, $$F_{max} = 48.17$$
$$F_{min} = 47.99$$

hence conditional expression (2) given above is satisfied.

Figure 5:
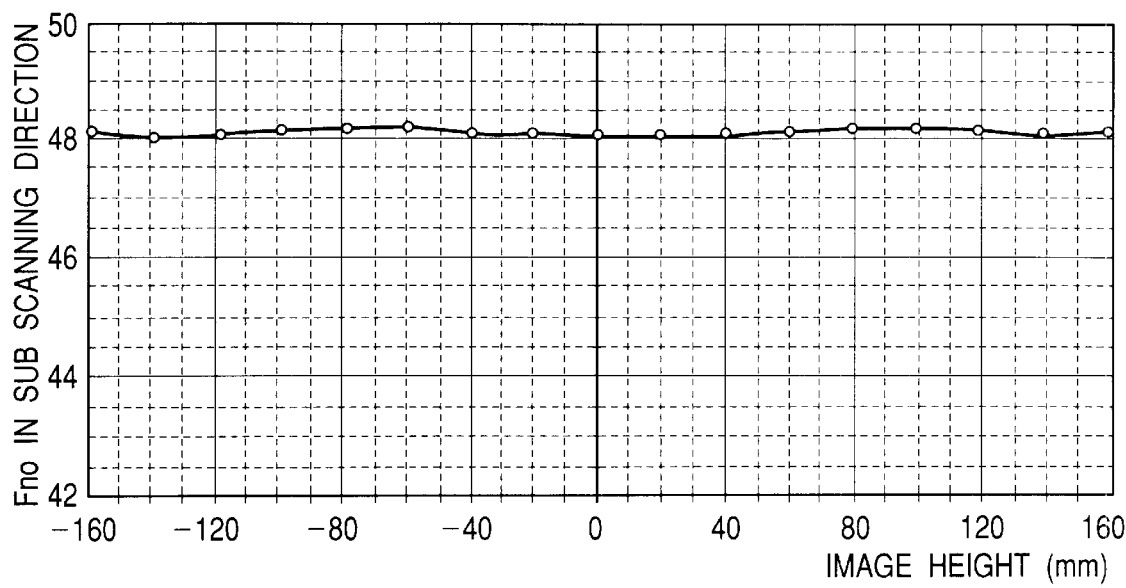
FIG. 5 is a graph showing the Fno in the sub scanning direction on a scanning target surface according to the first embodiment of the present invention.

FIG. 5 is a graph showing the F-number in the sub scanning direction on the scanning target surface 8 in this embodiment. It is obvious from FIG. 5 that the F-number in the sub scanning direction with respect to a light beam incident on the scanning target surface 8 within the image effective area is substantially constant, and the overall imaging magnification of the scanning optical element 6 in the sub scanning direction and the spot diameter in the sub scanning direction are uniform.

Figure 6:
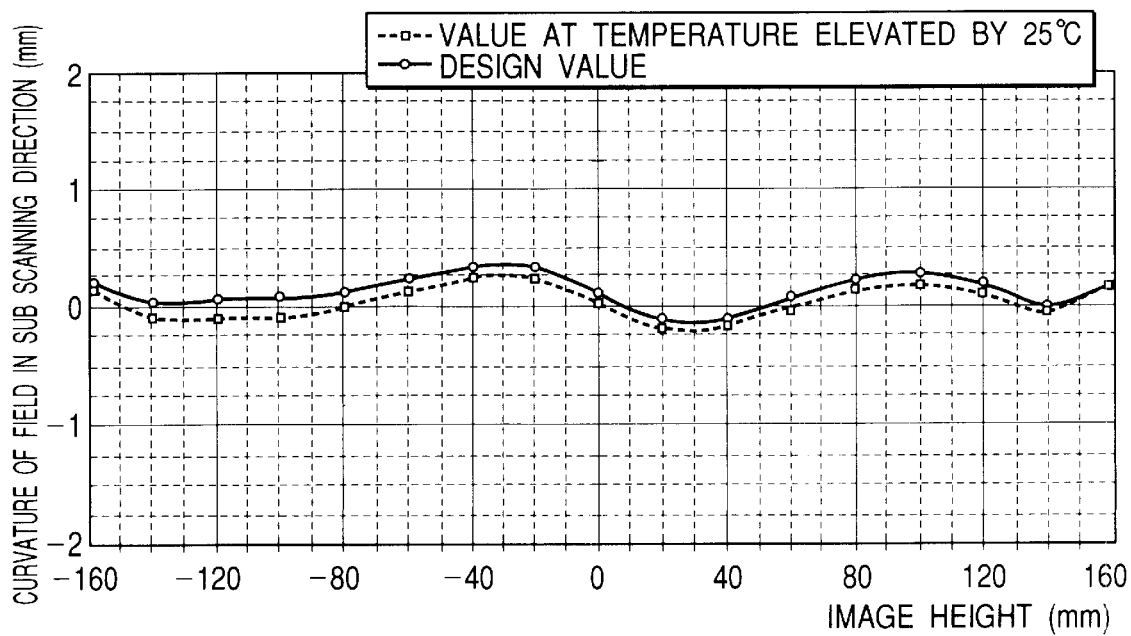
FIG. 6 is a graph showing the curvature of field in the sub scanning direction and environmental characteristic (change in image surface due to a rise in temperature) according to the first embodiment of the present invention.

FIG. 6 is a graph showing the curvature of field in the sub scanning direction and environmental characteristic (a change in image surface portion with a rise in temperature). Referring to FIG. 6, the solid line represents the curvature of field in the sub scanning direction in the initial (room temperature) state, and it is obvious that the curvature of field is properly corrected. In addition, the dashed line represents the curvature of field in the sub scanning direction with a rise in temperature (+25° C. from room temperature). Obviously, in this embodiment, since the power ratio between the refraction surface and diffraction surface in the sub scanning direction is set to an appropriate value to satisfy conditional expression (1) given above:

$$\phi S_r / \phi S_d = 2.52$$

the curvature of field with a rise in temperature is almost the same as that at room temperature.

As described above, in this embodiment, the power of each of the refraction and diffraction surfaces of the scanning optical element 6 in the sub scanning direction is continuously changed from an on-axis portion toward an off-axis portion with respect to the main scanning direction. This makes it possible to make the F-number in the sub scanning direction with respect to a light beam incident on the scanning target surface uniform with a simple arrangement (inexpensive method) without impairing the environmental performance. As a consequence, the spot diameter in the sub scanning direction within the entire image effective area is made uniform, thus realizing a scanning optical device suitable for high-resolution printing.

Note that in this embodiment, the refraction optical element 61 is formed by one toric lens. However, the present invention is not limited to this, and this element may be comprised of a plurality of lenses.

Second Embodiment

The second embodiment of the present invention will be described next.

This embodiment differs from the first embodiment in that a light source means is formed by a multi-beam laser having a plurality of emission points and one surface whose radius of curvature continuously changes from an on-axis portion toward an off-axis portion is added. Other arrangements and optical functions are the same as those of the first embodiment, and hence the second embodiment has the same effects as those of the first embodiment.

Table 2 shows design data in this embodiment.

TABLE 2

| Design Data | | | | | | | |
|---|---|---|---|---|---|---|---|
| Wavelength Refractive Index | | | Surface Shape of Toric Lens 61 | | Surface Shape of Long Diffraction Element 62 | | |
| | | | First Surface | Second Surface | | | |
| Wavelength Used | λ(nm) | 780 | | | | First Surface | Second Surface |
| Refractive Index of Toric Lens 61 | ndt | 1.53064 | R  −8.84696E+01 | −4.63992E+01 | R | −3.43494E+02 | ∞ |
| Abbe Number | υdt | 55.5 | K  −5.39190E−01 | −8.46048E−01 | K | −4.10368E+01 | |
| Refractive Index of Long Diffraction Element 62 | ndd | 1.53064 | B4  1.16004E−06 | 3.12272E−07 | B4 | 2.14788E−07 | |
| Abbe Number | υdd | 55.5 | B6  1.34535E−09 | 5.20228E−10 | B6 | −1.99348E−11 | |
| Angle of Incident Light | | | B8  −1.08687E−12 | 5.33696E−13 | B8 | 1.07627E−15 | |
| Polygon Incident Angle | θp | −70.0 | B10  1.83812E−16 | −3.91099E−16 | B10 | −2.82629E−20 | |
| Polygon Maximum Exit Angle | θe | 45.0 | r  1.04247E+03 | −2.09088E−01 | Phase Function of Long Diffraction Element 62 | | |
| | | | D2$_s$  1.08848E−03 | 9.72238E−05 | | First Surface | Second Surface |
| Arrangement | | | D4$_s$  −3.05261E−06 | 1.07444E−08 | | | −2.80000E−04 |
| Polygon Surface | e1 | 30.0 | D6$_s$  1.48890E−09 | 1.73269E−11 | b2 | | |
| Center Thickness of Toric Lens | d1 | 11.0 | D2$_e$  1.08848E−03 | 1.58805E−04 | b4 | | 1.05268E−08 |
| | | | | | b6 | | −1.41997E−12 |

TABLE 2-continued

| | | | | Design Data | | | |
|---|---|---|---|---|---|---|---|
| Toric Lens - Long Diffraction Element | e2 | 75.0 | D4$_e$ | −3.05261E−06 | −5.43340E−08 | b8 | 1.14984E−16 |
| Center Thickness of Long Diffraction Element | d2 | 5.0 | D6$_e$ | 1.48890E−09 | 5.43467E−11 | b10 | −4.39247E−21 |
| Long Diffraction Element - Scanning Target Surface | Sk | 111.0 | | | | d0 | −5.11279E−03 |
| Polygon Axis - Scanning Target Surface | L | 232.0 | suffix s indicates laser side | | | d1 | 1.32455E−06 |
| Effective Scanning Width | W | 297.0 | suffix e indicates side opposite to laser | | | d2 | 6.53388E−08 |
| | | | Y-axis sign + indicates side opposite to laser | | | d3 | −5.97665E−11 |
| | | | | | | d4 | 1.11649E−12 |

In this embodiment, the radii of curvature of an incident surface 61a and exit surface 61b of a toric lens 61 in the sub scanning direction are continuously changed from an on-axis portion toward an off-axis portion with respect to the main scanning direction. In addition, the diffraction power of an exit surface 62b of a diffraction optical element 62 is continuously changed from an on-axis portion toward an off-axis portion with respect to the main scanning direction.

Note that in this embodiment, a change in the radius of curvature of the exit surface 61b of the toric lens 61 in the sub scanning direction is made asymmetrical with a change in the diffraction power of the exit surface 62b of the diffraction optical element 62 in the sub scanning direction with respect to the optical axis of a scanning optical element 6.

As in the first embodiment, in this embodiment, the F-number in the sub scanning direction with respect to a light beam incident on a scanning target surface 8 within an image effective area is substantially constant, and the overall imaging magnification of the scanning optical element 6 in the sub scanning direction and the spot diameter in the sub scanning direction are uniform.

In addition, in this embodiment, a multi-beam source for emitting two optically modulated light beams is used as a light source means, and the scanning target surface is scanned with two scanning lines spaced apart from each other by a predetermined amount.

Figure 7:
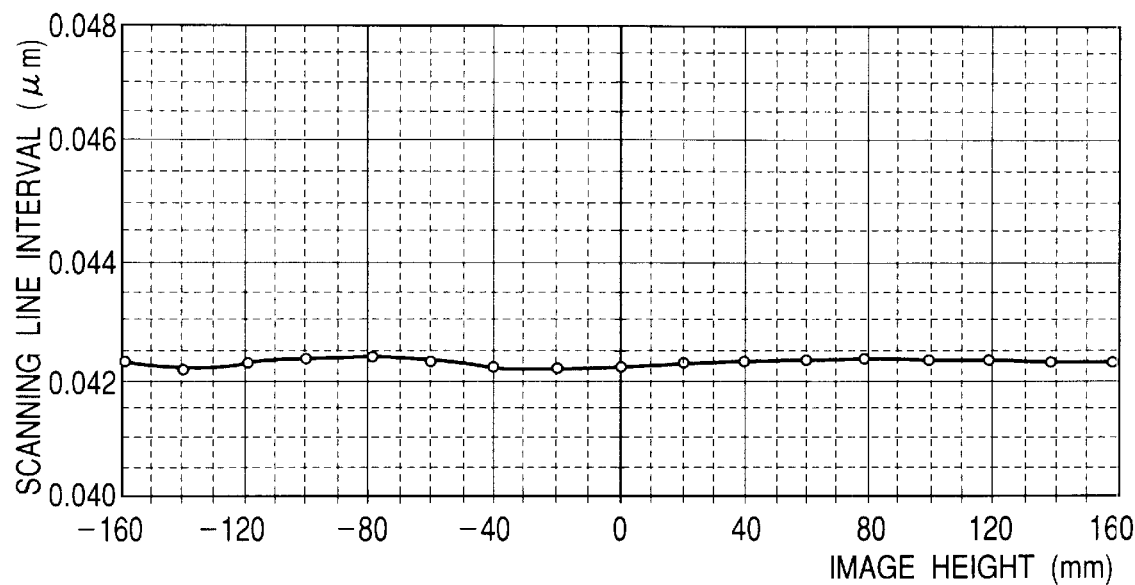
FIG. 7 is a graph showing the scanning line intervals on a scanning target surface according to the second embodiment of the present invention.

FIG. 7 is a graph showing the scanning line intervals on the scanning target surface 8 when this embodiment is used at a scanning line density of 600 dpi in the sub scanning direction. It is obvious from FIG. 7, since the imaging magnification in the sub scanning direction is uniform, the scanning line intervals are substantially constant within the image effective area.

Figure 8:
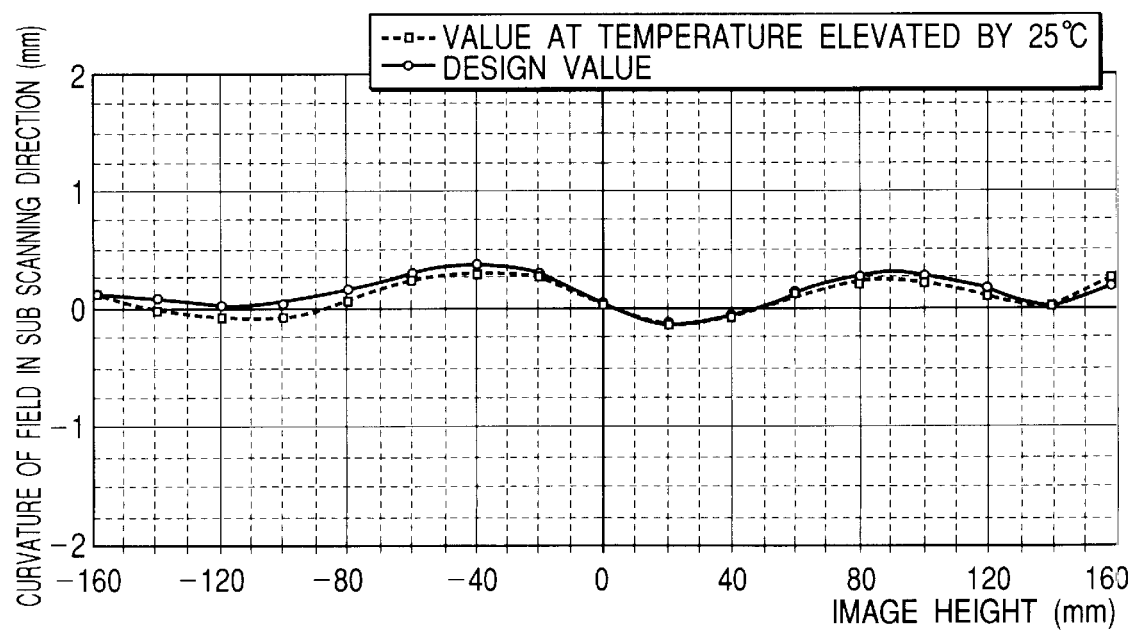
FIG. 8 is a graph showing the curvature of field in the sub scanning direction and environmental characteristic (change in image surface due to a rise in temperature) according to the second embodiment of the present invention.

FIG. 8 is a graph showing the curvature of field in the sub scanning direction and environmental characteristic (a change in image surface portion with a rise in temperature). Referring to FIG. 8, the solid line represents the curvature of field in the sub scanning direction in the initial (room temperature) state, and it is obvious that the curvature of field is properly corrected. In addition, the dashed line represents the curvature of field in the sub scanning direction with a rise in temperature (+25° C. from room temperature). Obviously, in this embodiment, since the power ratio between the refraction surface and diffraction surface in the sub scanning direction is set to an appropriate value to satisfy conditional expression (1) given above:

$$\phi S_r/\phi S_d = 2.55$$

the curvature of field with a rise in temperature is almost the same as that at room temperature.

Note that in this embodiment, since there are three surfaces whose powers continuously change in the sub scanning direction, a target in the sub scanning direction can be corrected with higher precision without correlation with the surface shape in the main scanning direction.

As described above, in this embodiment, the light source means is formed by a multi-beam laser, and the powers of the two refraction surfaces and one diffraction surface of the scanning optical element in the sub scanning direction are continuously changed from an on-axis portion toward an off-axis portion with respect to the main scanning direction. This makes it possible to make the F-number in the sub scanning direction with respect to a light beam incident on the scanning target surface uniform with a simple arrangement without impairing the environmental performance. As a consequence, the spot diameter in the sub scanning direction within the entire image effective area is made uniform, and the scanning line intervals based on two light beams emitted from the multi-beam laser become substantially constant within the image effective area, thus realizing a scanning optical device (multi-beam scanning optical device) suitable for high-resolution printing with little pitch irregularity.

In the present invention, as a multi-beam laser, a light source means for emitting three or more light beams may be used.

Third Embodiment

Figure 9:
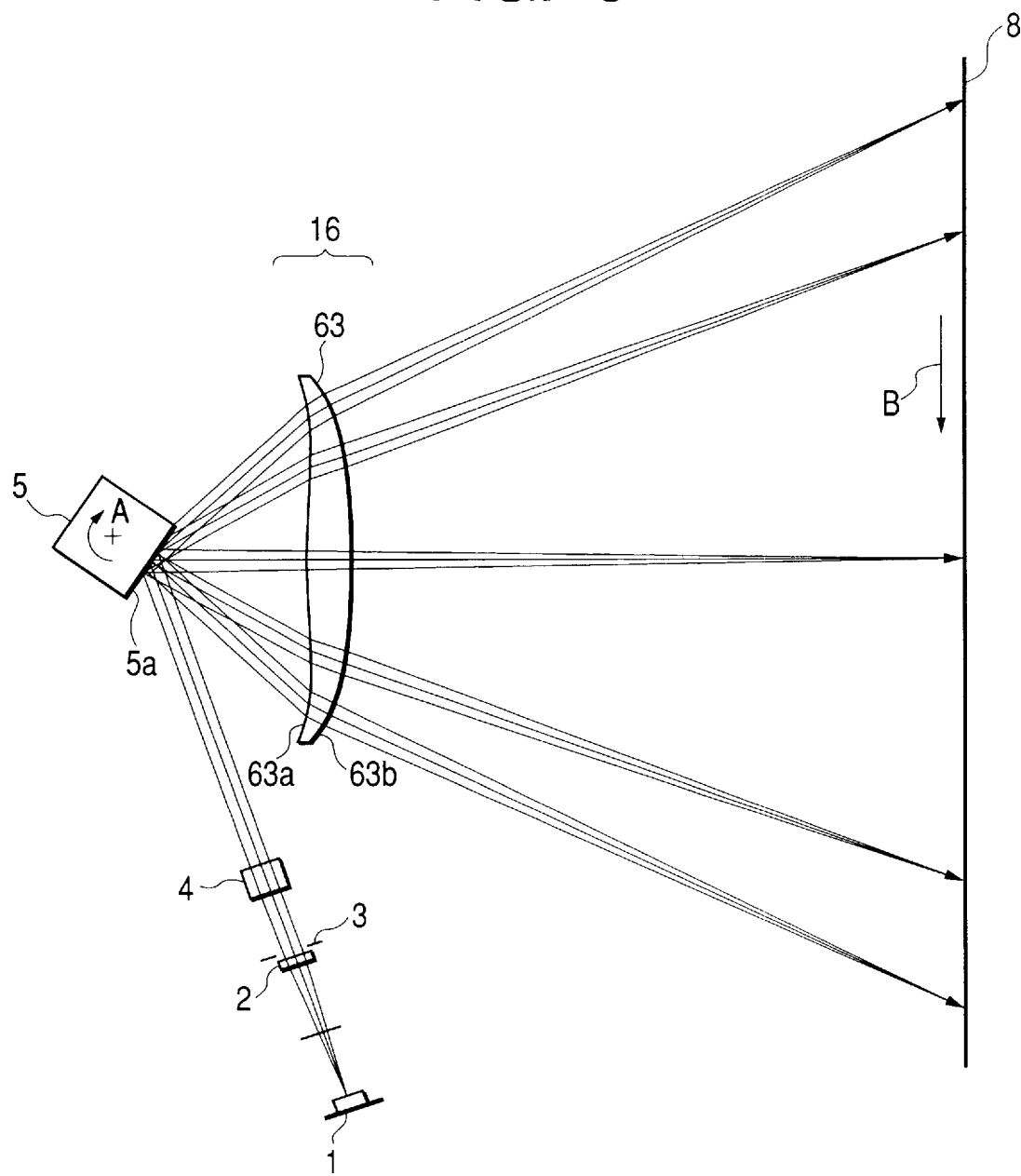
FIG. 9 is a main scanning cross-sectional view of the third embodiment of the present invention.

FIG. 9 is a sectional view (main scanning cross-sectional view) of the main part of the third embodiment of the present invention in the main scanning direction. The same reference numerals as in FIG. 1 denote the same parts in FIG. 9.

This embodiment differs from the first embodiment described above in that a scanning optical element 16 is formed by one toric lens having a diffraction surface, and a surface different from that in the first embodiment is used as a surface whose radius of curvature continuously changes from an on-axis portion toward an off-axis portion in accordance with the arrangement of the scanning optical element 16. Other arrangements and optical functions are the same as those of the first embodiment, and hence the second embodiment has the same effects as those of the first embodiment.

Table 3 shows design data in this embodiment.

TABLE 3

Design Data

| Wavelength Refractive Index | | | Surface Shape of Toric Lens 61 | | Surface Shape of Long Diffraction Element 62 | |
|---|---|---|---|---|---|---|
| Wavelength Used | λ(nm) | 780 | First Surface | Second Surface | First Surface | Second Surface |
| Refractive Index of Toric Lens 61 | ndt | 1.53064 | R 1.97187E+02 | −2.83665E+02 | b2 | −1.11502E−03 |
| Abbe Number | υdt | 55.5 | K −5.21918E+01 | 1.80666E+01 | b4 | −2.05718E−07 |
| | | | B4 −8.72905E−07 | −4.55253E−07 | b6 | 1.62721E−10 |
| | | | B6 −2.44417E−10 | −4.95922E−10 | b8 | −7.12666E−14 |
| Angle of Incident Light | | | B8 −7.76053E−14 | 2.11516E−14 | b10 | 1.33719E−18 |
| Polygon Incident Angle | θp | −70.0 | B10 3.14992E−17 | −1.55929E−17 | d0 | −6.11802E−03 |
| Polygon Maximum Exit Angle | θe | 40.0 | r 1.36147E+02 | −3.78473E+01 | d1 | 1.19509E−06 |
| Arrangement | | | D2$_s$ −4.90210E−05 | −1.36802E−04 | d2 | 4.08148E−06 |
| | | | D4$_s$ −7.09438E−07 | 2.81478E−07 | d3 | 2.38488E−08 |
| Polygon Surface | e1 | 38.0 | D6$_s$ 3.62892E−10 | | d4 | −1.52237E−09 |
| Center Thickness of Toric Lens | d1 | 10.0 | D8$_s$ 1.83170E−13 | | | |
| | | | D10$_s$ −1.05681E−16 | | | |
| | | | D2$_e$ 3.61923E−04 | −1.36802E−04 | suffix s indicates laser side | |
| Toric Lens - Scanning target surface | Sk | 147.0 | D4$_e$ −5.17172E−06 | 2.81478E−07 | suffix e indicates side opposite to laser | |
| Polygon Surface - Scanning target surface | L | 195.0 | D6$_e$ 9.11304E−09 | | Y-axis sign + indicates side opposite to laser | |
| Effective Scanning Width | W | 210.0 | D8$_e$ −6.69304E−12 | | | |
| | | | D10$_e$ 1.81899E−15 | | | |

In this embodiment, an incident surface 63a of a toric lens 63 having a diffraction surface is formed into a toric surface shape, and an exit surface 63b is formed by forming a two-dimensional diffraction grating on a toric surface. The radius of curvature of the incident surface 63a in the sub scanning direction is continuously changed from an on-axis portion toward an off-axis portion with respect to the main scanning direction, and the diffraction power of the exit surface 63b is continuously changed from an on-axis portion toward an off-axis portion with respect to the main scanning direction.

Note that in this embodiment, a change in the radius of curvature of the incident surface 63a of the toric lens 63 in the sub scanning direction is made asymmetrical with a change in the diffraction power of the exit surface 63b in the sub scanning direction with respect to the optical axis of the scanning optical element 16.

Figure 10:
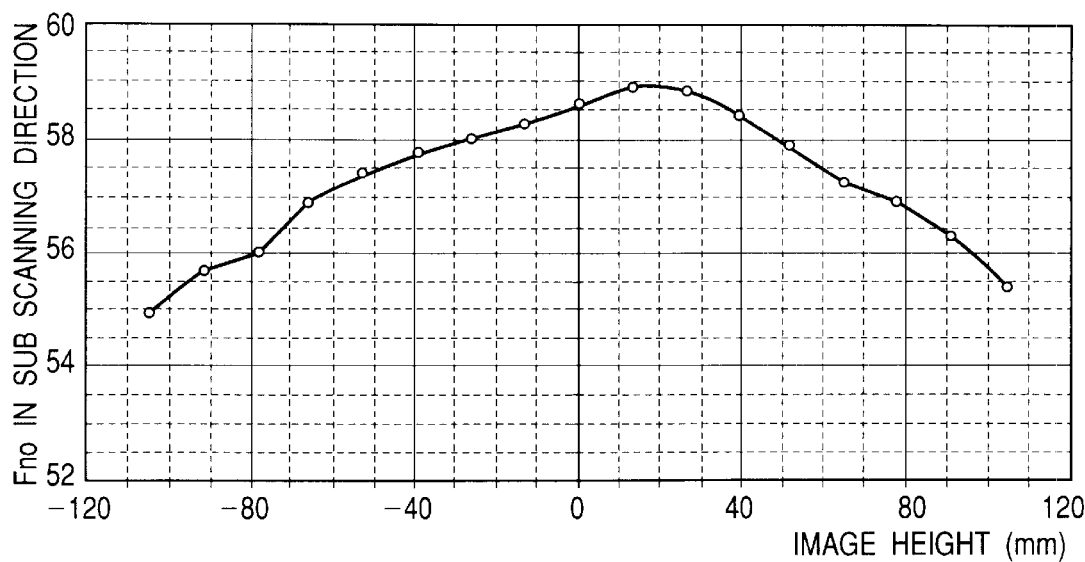
FIG. 10 is a graph showing the Fno in the sub scanning direction on a scanning target surface according to the third embodiment of the present invention.

FIG. 10 is a graph showing the F-number in the sub scanning direction on a scanning target surface 8 in this embodiment. It is obvious from FIG. 10 that the F-number in the sub scanning direction with respect to a light beam incident on the scanning target surface 8 within the image effective area is substantially constant, and the overall imaging magnification of the scanning optical element 16 in the sub scanning direction and the spot diameter in the sub scanning direction are uniform.

Figure 11:
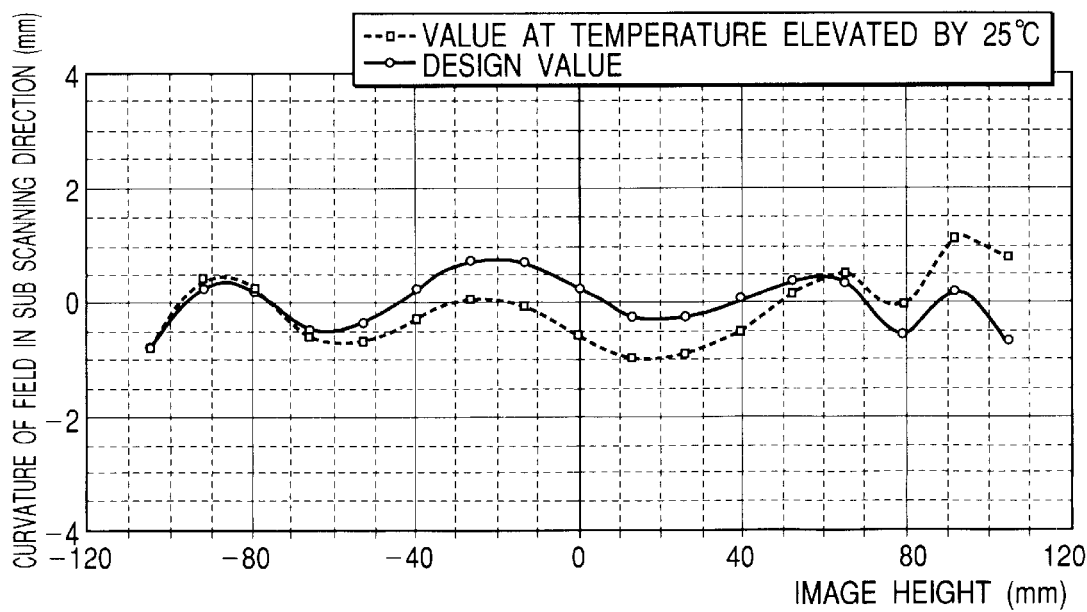
FIG. 11 is a graph showing the curvature of field in the sub scanning direction and environmental characteristic (change in image surface due to a rise in temperature) according to the third embodiment of the present invention.

FIG. 11 is a graph showing the curvature of field in the sub scanning direction and environmental characteristic (a change in image surface portion with a rise in temperature).

Referring to FIG. 11, the solid line represents the curvature of field in the sub scanning direction in the initial (room temperature) state, and it is obvious that the curvature of field is properly corrected. In addition, the dashed line represents the curvature of field in the sub scanning direction with a rise in temperature (+25° C. from room temperature). Obviously, in this embodiment, since the power ratio between the refraction surface and diffraction surface in the sub scanning direction is set to an appropriate value to satisfy conditional expression (1) given above:

$$\phi S_r / \phi S_d = 1.42$$

the curvature of field with a rise in temperature is almost the same as that at room temperature.

As described above, according to this embodiment, even in the scanning optical element formed by one toric lens, by continuously changing the power of each of refraction surface and diffraction surface in the sub scanning direction from an on-axis portion toward an off-axis portion with respect to the main scanning direction, the F-number in the sub scanning direction with respect to a light beam incident on the scanning target surface can be made uniform with a simple arrangement without impairing the environmental performance. As a consequence, the spot diameter in the sub scanning direction within the entire image effective area becomes uniform, thus realizing a scanning optical device suitable for high-resolution printing.

Fourth Embodiment

The fourth embodiment of the present invention will be described next.

This embodiment differs from the third embodiment described above in that a light source means is formed by a multi-beam laser having a plurality of emission points. Other arrangements and optical functions are the same as those of the third embodiment, and hence the fourth embodiment has the same effects as those of the third embodiment.

In this embodiment, the light source means is formed by a multi-beam laser, and the radius of curvature of the incident surface of the toric lens in the sub scanning direction is continuously changed from an on-axis portion toward an off-axis portion with respect to the main scanning direction. In addition, the diffraction power of the exit surface is continuously changed from an on-axis portion toward an off-axis portion with respect to the main scanning direction of the toric lens.

As in the second embodiment described above, in the multi-beam scanning optical device using the multi-beam laser, the scanning line intervals based on two light beams emitted from the multi-beam laser can be made substantially constant within the image effective area, thereby realizing a scanning optical device (multi-beam scanning optical device) suitable for high-resolution printing with little pitch irregularity.

In the present invention, as a multi-beam laser, a light source means for emitting three or more light beams may be used.

Image Forming Apparatus

Figure 12:
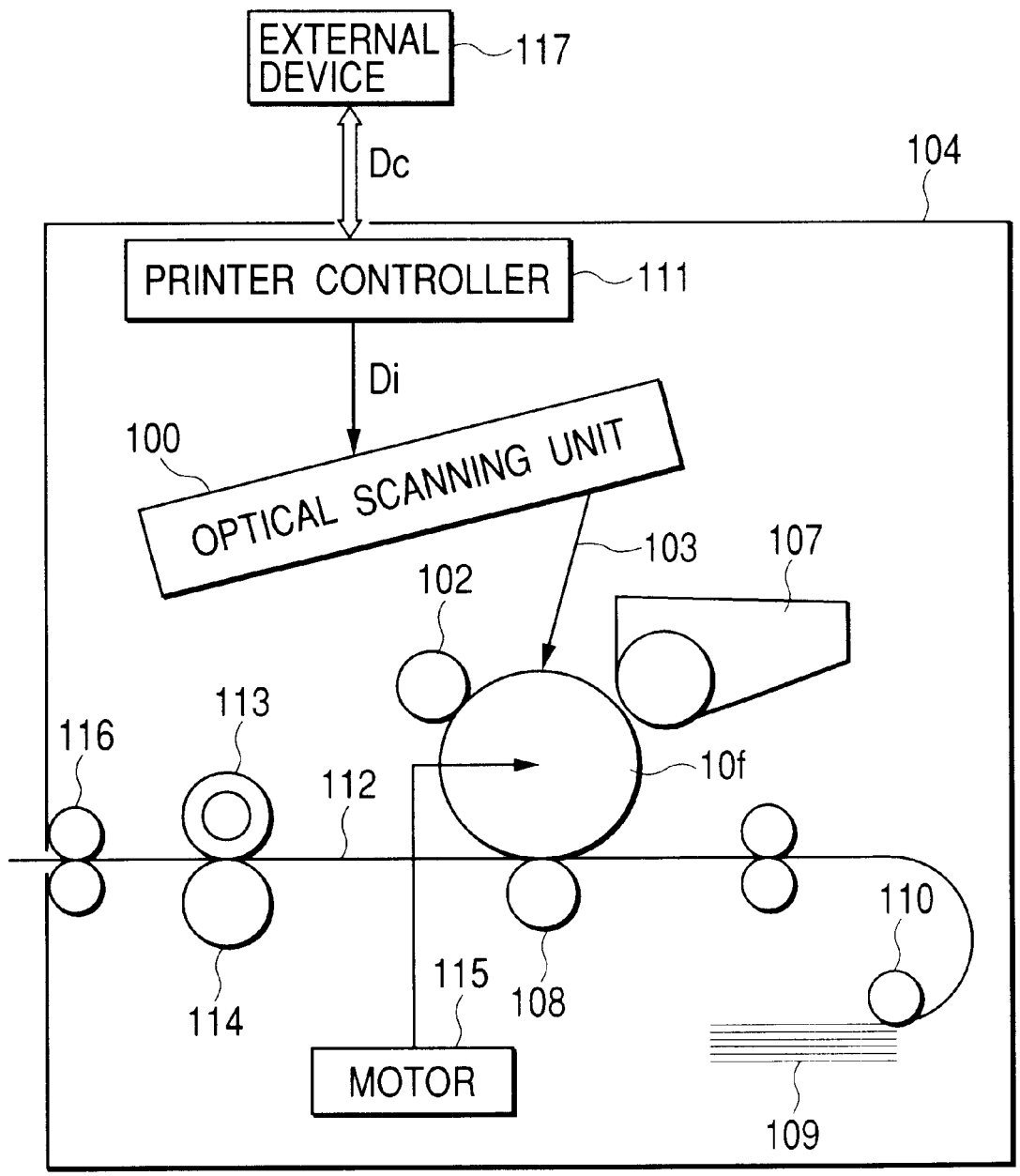
FIG. 12 is a sectional view of the main part of an arrangement of an image forming apparatus (electrophotographic printer) using the scanning optical device of the present invention in the sub scanning direction.

FIG. 12 is a sectional view of the main part of an embodiment of an image forming apparatus (electrophotographic printer) using one of the scanning optical devices according to the first to fourth embodiments described above. Referring to FIG. 12, an image forming apparatus 104 receives code data Dc from an external device 117 such as a personal computer. A printer controller 111 in the apparatus converts this code data Dc into image data (dot data) Di. This image data Di is input to an optical scanning unit 100. A light beam 103 modulated in accordance with the image data Di then emerges from the optical scanning unit (scanning optical device) 100. The photosensitive surface of a photosensitive drum 101 is scanned with this light beam 103 in the main scanning direction.

The photosensitive drum 101 serving as an electrostatic latent image carrier (photosensitive member) is rotated clockwise by a motor 115. Upon this rotation, the photosensitive surface of the photosensitive drum 101 moves relative to the light beam 103 in the sub scanning direction perpendicular to the main scanning direction. A charge roller 102 for uniformly charging the surface of the photosensitive drum 101 is placed above the photosensitive drum 101 so as to come into contact with its surface. The surface of the photosensitive drum 101 charged by the charge roller 102 is irradiated with the light beam 103 scanned by the optical scanning unit 100.

As described above, the light beam 103 is modulated on the basis of the image data Di. When the surface of the photosensitive drum 101 is irradiated with this light beam 103, an electrostatic latent image is formed on the surface. This electrostatic latent image is developed into a toner image by a developing unit 107 that is placed on the downstream side in the rotating direction of the photosensitive drum 101 relative to the irradiation portion of the light beam 103 so as to come into contact with the photosensitive drum 101. The toner particles used in this case are opposite in polarity to the charges formed by the charge roller 102. The unexposed portion of the photosensitive drum becomes a portion (image portion) to which the toner adheres. That is, in this embodiment, so-called normal development is performed. Note that in this embodiment, reverse development may be performed, in which toner adheres to the exposed portion of the photosensitive drum.

Figure 14:
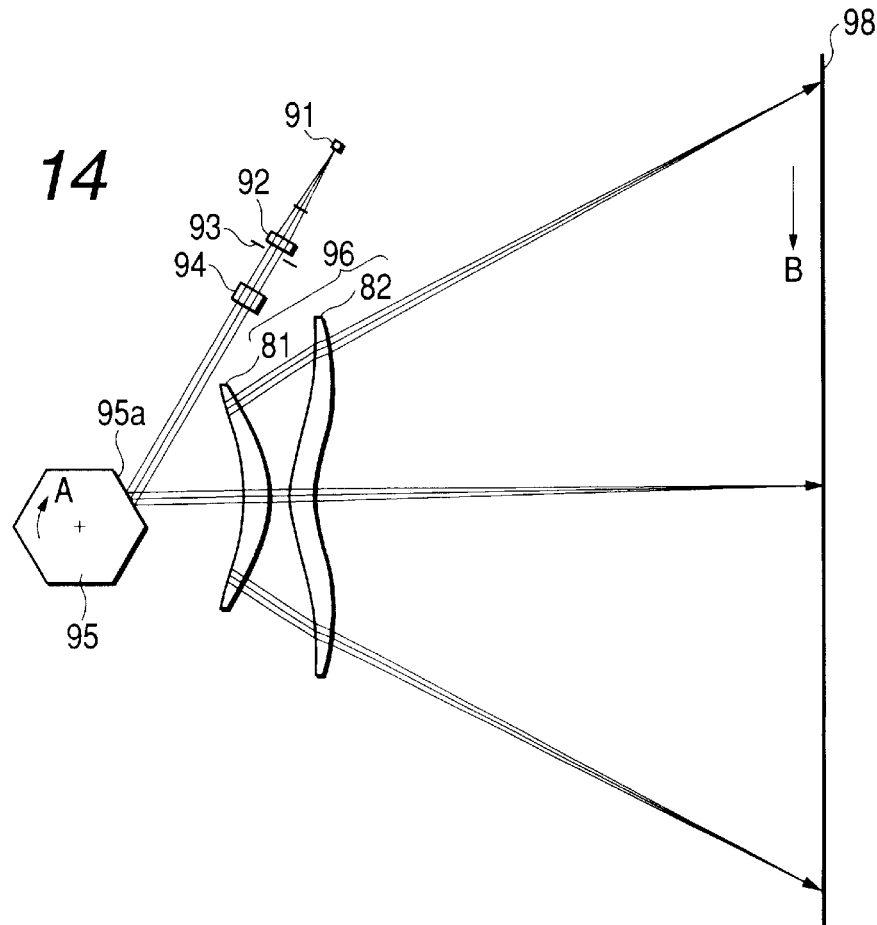
FIG. 14 is a schematic view of the main part of a conventional scanning optical device.

The toner image developed by the developing unit 107 is transferred onto a paper sheet 112 as a transfer material by a transfer roller 108 placed below the photosensitive drum 101 to oppose it. The paper sheet 112 is stored in a paper cassette 109 in front of the photosensitive drum 101 (on the right side in FIG. 14). However, this sheet can also be manually fed. A feed roller 110 is placed at an end portion of the paper cassette 109 to feed the paper sheet 112 in the paper cassette 109 onto the convey path.

The paper sheet 112 onto which the unfixed toner image is transferred in the above manner is further conveyed to the fixing unit behind the photosensitive drum 101 (on the left side in FIG. 12). The fixing unit is comprised of a fixing roller 113 having a fixing heater (not shown) inside and a press roller 114 pressed against the fixing roller 113. The paper sheet 112 conveyed from the transfer unit is heated while being pressed by the press portion between the fixing roller 113 and the press roller 114 to fix the unfixed toner image on the paper sheet 112. In addition, paper discharge rollers 116 are placed behind the fixing roller 113 to discharge the image-fixed paper sheet 112 outside the image forming apparatus.

Although not shown in FIG. 12, the printer controller 111 controls the respective units in the image forming apparatus, e.g., the motor 115, the polygon motor in the optical scanning unit 100, and the like as well as data conversion described above.

According to the present invention, as described above, the scanning optical element is constituted by a refraction surface and diffraction surface, and the radius of curvature of at least one of the surfaces in the sub scanning direction is continuously changed from an on-axis portion toward an off-axis portion with respect to the main scanning direction. In addition, the diffraction power of at least one diffraction surface is continuously changed from an on-axis portion toward an off-axis portion with respect to the main scanning direction, thereby making the F-number (Fno) in the sub scanning direction with respect to a light beam incident on the scanning target surface substantially constant within the image effective area. This makes it possible to make the spot diameter in the sub scanning direction uniform in the entire image effective area while keeping the correcting effect for the curvature of field in the sub scanning direction, the correcting effect for surface inclination, the temperature compensation effect, and the like. In addition, in the scanning optical device having the multi-beam source, the scanning line intervals based on a plurality of light beams emitted from the multi-beam source can be made substantially constant on the scanning target surface, thereby realizing a scanning optical device most suitable for high-resolution image recording with little pitch irregularity and an image forming apparatus using the device.

What is claimed is:

1. A scanning optical device comprising:
    a deflection element which reflects/deflects a light beam emitted from light source means in a main scanning direction; and
    a scanning optical system which forms the light beam reflected/deflected by said deflection means into an image on a scanning target surface,
    wherein said scanning optical system includes an optical element having at least one diffraction surface and at least one optical element having a refraction surface, and a radius of curvature of at least one refraction surface in a sub scanning direction changes from an on-axis portion toward an off-axis portion with respect to the main scanning direction and a diffraction power of at least one diffraction surface in the sub scanning direction changes from an on-axis portion toward an off-axis portion with respect to the main scanning direction.

2. A device according to claim 1, wherein the radius of curvature of said at least one refraction surface in the sub scanning direction continuously changes from an on-axis portion toward an off-axis portion with respect to the main scanning direction.

3. A device according to claim 1, wherein the diffraction power of said at least one diffraction surface in the sub scanning direction continuously changes from an on-axis portion toward an off-axis portion with respect to the main scanning direction.

4. A device according to claim 1, wherein an F-number in the sub scanning direction with respect to a light beam incident on the scanning target surface is made substantially constant within an image effective area by changing the radius of curvature of said at least one refraction surface in the sub scanning direction and the diffraction power of said at least one diffraction surface in the sub scanning direction.

5. A device according to claim 1, wherein an image magnification of said scanning optical system in the sub scanning direction is substantially constant within an image effective area.

6. A device according to claim 1, wherein letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9.$$

7. A device according to claim 1, wherein a change in focus of said scanning optical device on the scanning target surface in the sub scanning direction due to an environmental variation is compensated for by changes in power of the refraction surface and diffraction surface of said scanning optical system and a change in wavelength of said light source means.

8. A device according to claim 1, wherein letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r/\phi S_d < 2.6.$$

9. A device according to claim 1, wherein at least one of a change in the radius of curvature of the refraction surface of said scanning optical system in the sub scanning direction and a change in the diffraction power of the diffraction surface in the sub scanning direction is asymmetrical with respect to the optical axis of said scanning optical system.

10. A device according to claim 1, wherein at least one optical element of said scanning optical system is manufactured by plastic molding.

11. A scanning optical device comprising:

light source means for emitting a plurality of light beams which are optically modulated independently;

a deflection element which reflects/deflects a plurality of light beams in a main scanning direction; and a scanning optical system which forms the plurality of light beams reflected/deflected by said deflection means into an image on a scanning target surface, wherein said scanning optical system includes an optical element having at least one diffraction surface and at least one optical element having a refraction surface, and a radius of curvature of at least one refraction surface in a sub scanning direction changes from an on-axis portion toward an off-axis portion with respect to the main scanning direction and a diffraction power of at least one diffraction surface in the sub scanning direction changes from an on-axis portion toward an off-axis portion with respect to the main scanning direction.

12. A device according to claim 11, wherein the radius of curvature of said at least one refraction surface in the sub scanning direction continuously changes from an on-axis portion toward an off-axis portion with respect to the main scanning direction.

13. A device according to claim 11, wherein the diffraction power of said at least one diffraction surface in the sub scanning direction continuously changes from an on-axis portion toward an off-axis portion with respect to the main scanning direction.

14. A device according to claim 11, wherein an F-number in the sub scanning direction with respect to a light beam incident on the scanning target surface is made substantially constant within an image effective area by changing the radius of curvature of said at least one refraction surface in the sub scanning direction and the diffraction power of said at least one diffraction surface in the sub scanning direction.

15. A device according to claim 11, wherein an image magnification of said scanning optical system in the sub scanning direction is substantially constant within an image effective area.

16. A device according to claim 11, wherein letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9.$$

17. A device according to claim 11, wherein a change in focus of said scanning optical device on the scanning target surface in the sub scanning direction due to an environmental variation is compensated for by changes in power of the refraction surface and diffraction surface of said scanning optical system and a change in wavelength of said light source means.

18. A device according to claim 11, wherein letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r/\phi S_d < 2.6.$$

19. A device according to claim 11, wherein at least one of a change in the radius of curvature of the refraction surface of said scanning optical system in the sub scanning direction and a change in the diffraction power of the diffraction surface in the sub scanning direction is asymmetrical with respect to the optical axis of said scanning optical system.

20. A device according to claim 11, wherein at least one optical element of said scanning optical system is manufactured by plastic molding.

21. A scanning optical device comprising:

a deflection element which reflects/deflects a light beam emitted from light source means in a main scanning direction; and a scanning optical system which forms the light beam reflected/deflected by said deflection means into an image on a scanning target surface, wherein said scanning optical system includes a single optical element having refraction and diffraction surfaces, and a radius of curvature of the refraction surface in the sub scanning direction changes from an on-axis portion toward an off-axis portion, and a diffraction power of the diffraction surface in the sub scanning direction changes from an on-axis portion toward an off-axis portion with respect to the main scanning direction.

22. A device according to claim 21, wherein the radius of curvature of the refraction surface in the sub scanning direction continuously changes from an on-axis portion toward an off-axis portion with respect to the main scanning direction.

23. A device according to claim 21, wherein the diffraction power of the diffraction surface in the sub scanning direction continuously changes from an on-axis portion toward an off-axis portion with respect to the main scanning direction.

24. A device according to claim 21, wherein an F-number in the sub scanning direction with respect to a light beam incident on the scanning target surface is made substantially constant within an image effective area by changing the radius of curvature of the refraction surface in the sub scanning direction and the diffraction power of the diffraction surface in the sub scanning direction.

25. A device according to claim 21, wherein an image magnification of said scanning optical system in the sub scanning direction is substantially constant within an image effective area.

26. A device according to claim 21, wherein letting $F_{max}$ and $F_{min}$ be maximum and minimum values of an F-number in the sub scanning direction with respect to a light beam incident on the scanning target surface within an image effective area, the maximum and minimum values $F_{max}$ and $F_{min}$ satisfy $$F_{min}/F_{max} > 0.9.$$

27. A device according to claim 21, wherein a change in focus of said scanning optical device on the scanning target surface in the sub scanning direction due to an environmental variation is compensated for by changes in power of the refraction surface and diffraction surface of said scanning optical system and a change in wavelength of said light source means.

28. A device according to claim 21, wherein letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r/\phi S_d < 2.6.$$

29. A device according to claim 21, wherein one of a change in the radius of curvature of the refraction surface of said scanning optical system in the sub scanning direction and a change in the diffraction power of the diffraction surface in the sub scanning direction is asymmetrical with respect to the optical axis of said scanning optical system.

30. A device according to claim 21, wherein one optical element of said scanning optical system is manufactured by plastic molding.

31. A scanning optical device comprising:

light source means for emitting a plurality of light beams which are optically modulated independently;

a deflection element which reflects/deflects a plurality of light beams in a main scanning direction; and a scanning optical system which forms the plurality of light beams reflected/deflected by said deflection means into an image on a scanning target surface, wherein said scanning optical system includes a single optical element having refraction and diffraction surfaces, and a radius of curvature of the refraction surface in the sub scanning direction changes from an on-axis portion toward an off-axis portion, and a diffraction power of the diffraction surface in the sub scanning direction changes from an on-axis portion toward an off-axis portion with respect to the main scanning direction.

32. A device according to claim 31, wherein the radius of curvature of the refraction surface in the sub scanning direction continuously changes from an on-axis portion toward an off-axis portion with respect to the main scanning direction.

33. A device according to claim 31, wherein the diffraction power of the diffraction surface in the sub scanning direction continuously changes from an on-axis portion toward an off-axis portion with respect to the main scanning direction.

34. A device according to claim 31, wherein an F-number in the sub scanning direction with respect to a light beam incident on the scanning target surface is made substantially constant within an image effective area by changing the radius of curvature of the refraction surface in the sub scanning direction and the diffraction power of the diffraction surface in the sub scanning direction.

35. A device according to claim 31, wherein an image magnification of said scanning optical system in the sub scanning direction is substantially constant within an image effective area.

36. A device according to claim 31, wherein letting $F_{max}$ and $F_{min}$ be maximum and minimum values of an F-number in the sub scanning direction with respect to a light beam incident on the scanning target surface within an image effective area, the maximum and minimum values $F_{min}$ and $F_{min}$ satisfy $$F_{min}/F_{max} > 0.9.$$

37. A device according to claim 31, wherein a change in focus of said scanning optical device on the scanning target surface in the sub scanning direction due to an environmental variation is compensated for by changes in power of the refraction surface and diffraction surface of said scanning optical system and a change in wavelength of said light source means.

38. A device according to claim 31, wherein letting $\phi S_d$ be power of the diffraction surface of said scanning optical system on an optical axis in the sub scanning direction, and $\phi S_r$ be power of the diffraction surface on the optical axis in the sub scanning direction, the powers $\phi S_d$ and $\phi S_r$ satisfy $$1.0 < \phi S_r/\phi S_d < 2.6.$$

39. A device according to claim 31, wherein one of a change in the radius of curvature of the refraction surface of said scanning optical system in the sub scanning direction and a change in the diffraction power of the diffraction surface in the sub scanning direction is asymmetrical with respect to the optical axis of said scanning optical system.

40. A device according to claim 31, wherein one optical element of said scanning optical system is manufactured by plastic molding.

41. An image forming apparatus comprising said scanning optical device defined in any one of claims 1 to 40, a photosensitive member placed on the scanning target surface, a developing unit which develops an electrostatic latent image formed on said photosensitive member by a light beam scanned by said scanning optical device into a toner image, a transfer unit which transfers the developed toner image onto a transfer material, and a fixing unit which fixes the transferred toner image on the transfer material.

42. An image forming apparatus comprising said scanning optical device defined in any one of claims 1 to 40, and a printer controller which converts code data input from an external unit into an image signal and inputs the signal to said scanning optical device.

* * * * *

UNITED STATES PATENT AND TRADEMARK OFFICE
CERTIFICATE OF CORRECTION

PATENT NO. : 6,757,004 B2  Page 1 of 1
APPLICATION NO. : 10/053595
DATED : June 29, 2004
INVENTOR(S) : Kato It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 0 days Delete the phrase "by 0 days" and insert -- by 35 days--

COLUMN 20
    Line 64, "an optical" should be deleted;
    Line 65, "element having" should be deleted; and
    Line 66, "optical element having a" should be deleted.

COLUMN 22
    Line 1, "an optical" should be deleted;
    Line 2, "element having" should be deleted; and
    Line 3, "optical element having a" should be deleted.

COLUMN 24
    Line 6, "a single" should read --an--.

Signed and Sealed this

Twenty-fourth Day of October, 2006

JON W. DUDAS
*Director of the United States Patent and Trademark Office*